United States Patent
Byrum

[11] Patent Number: 4,459,748
[45] Date of Patent: Jul. 17, 1984

[54] Y-GAUGE ANGLE MEASURING DEVICE

[76] Inventor: Barney L. Byrum, 215 5th Ave. Dr. East, Bradenton, Fla. 33508

[21] Appl. No.: 446,237

[22] Filed: Dec. 2, 1982

[51] Int. Cl.³ ............................. G01B 3/56; G01B 5/24
[52] U.S. Cl. ..................................... 33/1 N; 33/174 E
[58] Field of Search ....................... 33/1 N, 170, 174 E

[56] References Cited

U.S. PATENT DOCUMENTS

| | | | |
|---|---|---|---|
| 1,637,757 | 8/1927 | Swanson | 33/174 E |
| 2,464,912 | 3/1949 | White | 33/170 |
| 2,565,140 | 8/1951 | Leustig | 33/170 |
| 2,975,524 | 3/1961 | Field | 33/174 E |
| 3,116,560 | 1/1964 | Matthews | 33/174 E |
| 4,206,548 | 6/1980 | Bergman | 33/174 E |

FOREIGN PATENT DOCUMENTS

| | | | |
|---|---|---|---|
| 328840 | 11/1920 | Fed. Rep. of Germany | 33/174 E |
| 2406183 | 6/1979 | France | 33/1 N |

Primary Examiner—Richard R. Stearns
Attorney, Agent, or Firm—Epstein & Edell

[57] ABSTRACT

An acute dihedral angle is measured by determining the slope of one plane relative to the other. A base member is disposed on one plane and has a threaded bore which axially extends perpendicular to the one plane. A screw member threadedly engages the base member bore and has a peripheral diameter D. An annular collar member threadedly engages the screw member between the base member and the second plane and has a peripheral diameter D'. The slope between the planes is measured by rotating the screw in the base member and the collar about the screw until the peripheries of both the screw and collar contact the second plane. The tangent of the acute angle between the planes can then be computed as $(y'-y)/(D'-D)$ $(\frac{1}{2})$, where $y'$ and $y$ are the distances from the first plane to the points of contact at the second plane of the screw and collar, respectively.

11 Claims, 4 Drawing Figures

Y-GAUGE ANGLE MEASURING DEVICE

BACKGROUND OF THE INVENTION

1. Technical Field

The present invention relates to measurement of dihedral angles and, more particularly, to a simple apparatus and method for dihedral angle measurement which is independent of the horizontal/vertical orientation of the angle-forming intersecting planes and of the accessibility, or lack thereof, of the line of intersection of the planes.

2. The Prior Art

A prior art technique for measuring dihedral angles is based on the use of a protractor or compass and requires that the line of intersection of the planes be accessible. However, very often the line of intersection is not accessible and this technique cannot be used. Other techniques for measuring dihedral angles employ vertical sensing means to determine the variation of one or both intersecting planes from vertical. These techniques, however, require that the line of intersection between the planes reside in a horizontal plane (i.e. the angle itself is in a vertical plane). Unfortunately, dihedral angles to be measured are not always so oriented. Often, the structure forming the angle is not conducive to the use of vertical sensing means, even if the line of the intersection is horizontal.

OBJECTS AND SUMMARY OF THE INVENTION

It is, therefore, an object of the present invention to provide a method and apparatus for measuring a dihedral angle, which method and apparatus can be used even if the line of intersection of the angle-forming planes is inaccessible.

It is another object of the present invention to provide a method and apparatus for measuring a dihedral angle which can be used irrespective of the orientation of the dihedral angle.

Still another object of the present invention is to provide a relatively simple and inexpensive apparatus for measuring dihedral angles.

In accordance with the present invention, a dihedral angle is measured indirectly by first determining the slope of one plane relative to the other and then computing the angle having a tangent corresponding to that slope. In the broadest aspect of the present invention, two members each include contact portions adapted to move along respective translation axes which are perpendicular to a first of the planes of the dihedral angle. The two axes are spaced by a predetermined distance and define a reference plane which is normal to the line of intersection of the angle-forming planes. The contact portions are translated along their respective axes until each contacts the second of the two planes of the dihedral angle. The contact distances from the first plane to each of the contact regions of the second plane are measured. The dihedral angle can then be computed as the angle having a tangent equal to the difference between the contact distances divided by the spacing between the translation axes.

In the preferred embodiment, a base member, placed on the first plane, has a threaded bore which extends perpendicular to that plane. A screw is threadedly engaged in the base member bore and is extended until its distal end makes peripheral contact with the other plane. An annular collar member is threadedly engaged about the screw and is rotated until it also makes peripheral contact with the second plane. The tangent of the dihedral angle can be computed as $(y'-y)/(D'-D)(\frac{1}{2})$, where $y'$ and $y$ are the contact distances from the first plane to the contact points of the second plane with the screw and collar, respectively, and wherein $D$ and $D'$ are the outer diameters of the screw and collar, respectively.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
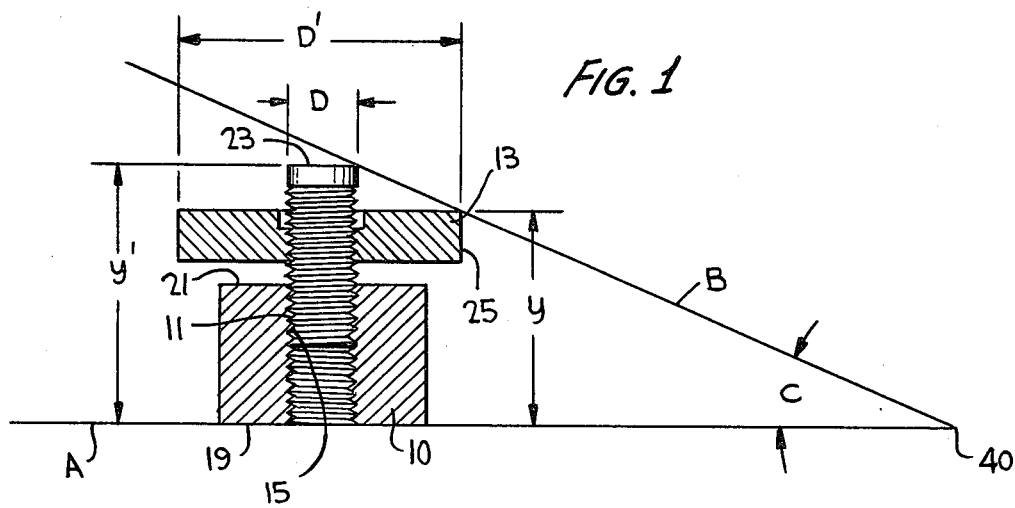
FIG. 1 is a partially diagrammatic view in section of the preferred embodiment of the present invention while in use in measuring a dihedral angle.

Referring specifically to FIG. 1 of the accompanying drawings, a device for measuring a dihedral angle C includes three parts, namely a base member 10, a screw member 11, and an annular collar member 13. The base member has defined therethrough a threaded bore 15 which is adapted to threadedly receive screw member 11. Collar member 13 has a threaded through-bore which is also adapted to receive screw 11.

The dihedral angle to be measured is represented in FIG. 1 as including two planar sides A and B with an included dihedral angle C. Base member 10 is configured such that when it is deployed on one plane A, for example, the longitudinal axis of bore 15 is oriented perpendicular to plane A. In the preferred embodiment of the present invention, this is achieved by providing an annular configuration for base member 10 so that one flat side 19 serves as a base surface and bore 15 is defined perpendicular to that surface. The opposite side 21 of the base member then faces generally toward the other plane B of the dihedral angle. It should be noted that bore 15 need not be defined through the entire length of base member 10, but instead could be extended only part way through the base member from surface 21. In either case, screw member 11 is threadedly inserted into bore 15 so as to extend beyond surface 21 of base member 10 toward plane B. Screw member 11 is sufficiently long to permit its distal end 23 to be extended into contact with plane B by rotating the screw member in bore 15. The distal end 23 of the screw member has an annular edge with a diameter D, which edge makes the necessary contact with plane B. The distance between plane A and plane B at the location of contact between distal end 23 and plane B is defined as $y'$.

Figure 2:
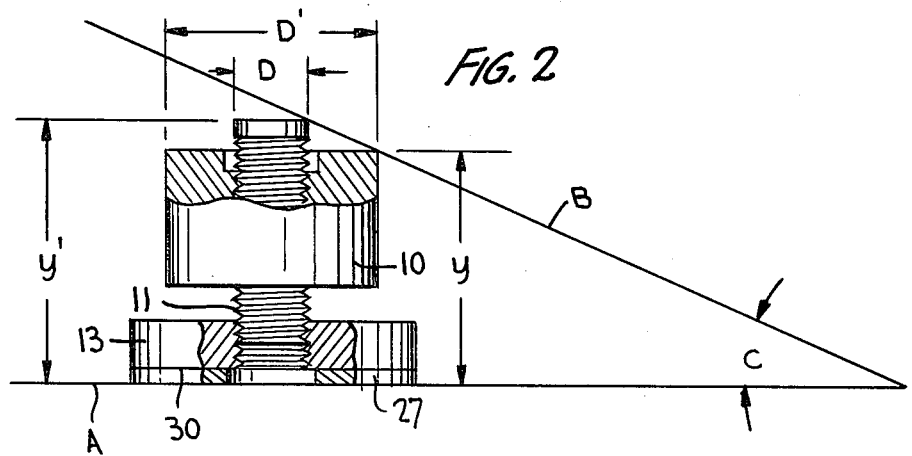
FIG. 2 is a view similar to that of FIG. 1 but wherein the base and collar members have been interchanged.

Collar member 13 is threadedly engaged about a portion of the screw member 11 which extends beyond surface 21 of base member 10. Collar member 13 is rotatable about screw member 11 to permit it to contact plane B at the upper edge of annular outer wall 25 of the collar member. The distance between plane A and plane B at this contact location is defined as y. The outer annular wall 25 of collar member 13 has a diameter D' which, by definition, is greater than the diameter D of screw member 11. Both diameters D and D' are centered about the central longitudinal axis of bore 15 since screw member is concentrically disposed in bore 15 and collar member 13 is concentrically disposed about screw member 11. The diameter D' of the collar member 13 can be larger or smaller than the diameter of base member 10. In fact, as illustrated in FIG. 2, the base member 10 and collar member 13 can be interchanged for certain measurements, whereby the collar member serves as the base and the base member is movable into contact with plane B.

Measurement of angle C between planes A and B is made by rotating the screw member 11 in bore 15 until the distal end 23 contacts plane B, and by rotating collar member 13 about the screw member 11 until the edge of annular wall 25 contacts plane B. Distances y' and y are then measured. From this data, angle C can be computed from the following equation:

$$\tan C = \frac{y' - y}{(D' - D)/2} \cdot \quad (1)$$

Once the tangent at angle C is known, the angle itself is readily determined.

Figure 3:
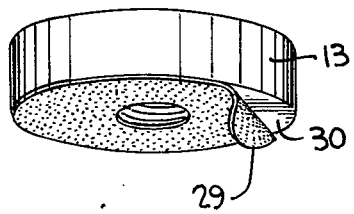
FIG. 3 is a view in perspective from the bottom of one of the base or collar members of the present invention.

The establishment of a deployment position for base member 10 (or the collar member 13 in the interchanged component embodiment of FIG. 2) may require treatment of the bottom surface of the base member and/or collar member. For example, with reference to FIG. 2, the bottom surface 30 of the collar member 13 is shown as having an annular magnetic attachment member 27 secured thereto. This permits the collar member, serving as a base support, to attach to plane A, if plane A is magnetically permeable, irrespective of any variation of plane A from horizontal. Alternatively, an adhesive layer 29, as illustrated in FIG. 3, may be employed for this purpose. Adhesive layer 29 is preferably a double-faced tape having adhesive on both sides and for which a protective backing is provided to prevent the exposed adhesive side from sticking to objects until the backing is removed.

Figure 4:
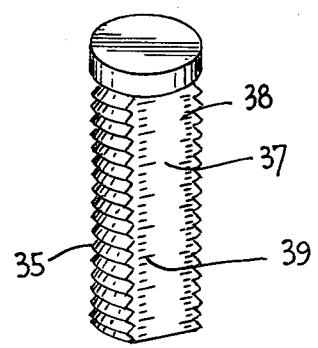
FIG. 4 is a view in perspective of a modified form of the screw member of the present invention.

Measurement of the contact distance y and y' may be made with any accurate linear distance measuring apparatus. Alternatively, and referring to FIG. 4, the screw member may take the form of screw 35 of FIG. 4 wherein the screw is truncated on one side along most of its length. The truncated surface 37 is provided with axially running length-calibrated scales 38 and 39 to permit direct measurement of y and y', respectively. Specifically, scale 39 is calibrated so that the scale marking aligned with the top surface 21 of base member 10 (in the FIG. 1 embodiment) is a measure of the distance between distal end 23 of screw member 11 and the base surface 19 of base member 10. When distal end 23 of the screw member is in contact with plane B, this scale provides a direct measurement of y'. Likewise, scale 38 is calibrated so that the scale marking aligned with the top surface of collar member 13 (in the FIG. 1 embodiment) is a measure of the distance between the top surface of the collar member and plane A. When the collar member contacts plane B, this scale provides a measurement of the parameter y. These scales permit the device to be used in the measurement of dihedral angles in which length-measuring implements cannot easily be inserted between planes A and B to measure y and y'.

The dihedral angle measuring device can be supplied with a plurality of screws of different lengths to replace screw member 11. Different lengths of screws permit different size angles to be measured more easily for different utilizations of the device.

The threads defining the engagement between screw member 11 and each of base member 10 and collar member 13 are preferably micrometer threads in order to permit highly accurate determination of y and y' and, in turn, to permit precise computation of angle C.

The precision required in the measurement of y and y' and in the determination of D and D' depends on the accuracy required in determining dihedral angle C. Using differentials as approximations of increments/decrements and assuming a certain value for the required accuracy of angle C, it follows from equation (1) that the tolerable error, var (y'−y), is greatest when C is a large angle and that the tolerable error, var (D'−D), is greatest when C is a small or large angle. Table I presents data to illustrate these points and also reveals the need to know the differences y'−y and D'−D to better than $1.45(D'-D)10^{-4}$ and $5.82(D'-D)10^{-4}$, respectively, when high precision in C (less than a minute of arc, e.g.) is required. It is noted that to achieve a given accuracy also requires comparable precision in mounting the axis of the screw normal to the base plane.

TABLE I

| | Y-GAUGE TOLERABLE ERRORS | |
|---|---|---|
| C (degrees) | $\frac{\text{var }(y' - y)}{(D' - D)\text{ var }C}$ (per radian) | $\frac{\text{var }(D' - D)}{(D' - D)\text{ var }C}$ (per radian) |
| 0 | 0.5000 | ∞ |
| 1 | 0.5002 | 57.308 |
| 5 | 0.5038 | 11.518 |
| 10 | 0.5156 | 5.8476 |
| 20 | 0.5662 | 3.1115 |
| 30 | 0.6667 | 2.3094 |
| 40 | 0.8520 | 2.0309 |
| 45 | 1.0000 | 2.0000 |
| 50 | 1.2101 | 2.0309 |
| 60 | 2.0000 | 2.3094 |
| 75 | 7.4641 | 4.0000 |
| 80 | 16.582 | 5.8476 |
| 89 | 1641.6 | 57.308 |
| 90 | ∞ | ∞ |

Looking at the dihedral angle measurement device of the present invention from another and broader perspective, it will be appreciated that, once the base member 10 is deployed, there are two mutually parallel measurement axes along which y and y' are measured. Both of these axes are perpendicular to the base plane A and define a measurement plane which is perpendicular to the line of intersection 40 of the planes A and B. This measurement plane is in the plane of the drawing in FIG. 1. The measurement axis for y' is defined as the perpendicular line from plane A which contacts the radially outer extremity of distal end 23 of screw member 11. The measurement axis for y is defined by the line perpendicular to plane A which contacts the radially outer extremity of the upper edge of annular wall 25 of collar member 13. When viewed from this perspective, the means for translating two contacting members in a direction perpendicular to plane A and into contact with plane B need not necessarily be the threadedly engaged members described hereinabove. Frictional sliding engagement, detented sliding engagement, and other engagements which permit longitudinal displacement of two members in a measurement plane perpendicular to base plane A may be employed. However, the threadedly engaged base, screw and collar embodiment is particularly advantageous since it inherently places the contacting points in a measurement plane perpendicular to intersection line 40, while also providing an accurate arrangement for translating the contacting members, namely screw member 11 and collar member 13.

While I have described and illustrated various specific embodiments of my invention, it will be clear that variations from the details of construction which are specifically illustrated and described may be resorted to without departing from the true spirit and scope of the present invention as defined in the appended claims.

What is claimed is:

1. Apparatus for measuring an acute dihedral angle formed between first and second planes, said apparatus comprising:

a base member having a first bore defined therein through at least one surface of said base member, said bore having a central longitudinally-extending axis about which said bore is internally threaded, said base member including means for positioning said base member in a deployed position on said first plane wherein said one surface faces generally away from said first plane and said longitudinal axis extends perpendicular to said first plane;

a generally cylindrical screw member having a shaft portion with a diameter D and which is peripherally threaded to threadedly engage said first bore in coaxial orientation with said central axis to permit said screw member to be selectively extended from and retracted into said base member by mutual rotation between said screw member and said base member;

an annular collar member having a peripheral diameter D' and an internally threaded second bore defined therethrough, said second bore being threaded for threadedly engaging said screw member in coaxial relation with said central axis to permit said collar member to be axially translated along said screw member by mutual rotation between said collar member and said screw member;

whereby measurement of said acute angle is effected with said base member in said deployed position and said screw member rotated with respect to said base member and said collar member rotated with respect to said screw member until the radial peripheries of said screw member and said collar member contact said second plane, whereupon the tangent of the measured acute angle is represented by $(y'-y)/(D'-D)(\frac{1}{2})$, where y' and y are the distances from the first plane to the points of contact at said second plane by the screw member and collar member, respectively.

2. The apparatus according to claim 1 wherein said means for positioning includes a flat base surface of said base member disposed on the opposite side of said base member from said one surface.

3. The apparatus according to claim 1 wherein said means for positioning includes means for securing said base member to said first plane.

4. The apparatus according to claim 1 wherein said base member is annular and said first bore is defined longitudinally therethrough, and wherein said collar member and said base member have different outer diameter and are positionally interchangeable.

5. The apparatus according to claim 1 wherein said screw member is marked with two lengthwise-extending length-measuring scales for measuring y and y'.

6. The apparatus according to claim 1 further comprising an additional screw member substantially identical to said first-mentioned screw member except as to length.

7. The apparatus according to claim 1 further comprising an additional collar member which is interchangeable with said first-mentioned collar member but has a different outer diameter.

8. The method of measuring an acute dihedral angle formed between first and second planes having a line of intersection, said method comprising the steps of:

translating a first member perpendicular to said first plane so that a predetermined portion of said first member moves along a first axis perpendicular to said first plane and contacts said second plane;

providing a second axis parallel to said first axis and defining a reference plane which is perpendicular to said line of intersection and contains said first and second axes, said first and second axes being spaced by a predetermined spacing;

translating a second member perpendicular to said first plane so that a predetermined portion of said second member moves along said second axis and contacts said second plane; and measuring the distances from said first plane to said predetermined portions of said first and second members in contact with said second plane.

9. The method according to claim 8 further comprising the steps of computing said dihedral angle as the angle having a tangent equal to the difference between said measured distances divided by said predetermined spacing.

10. The method according to claim 9 further comprising the steps of:

placing a base member on said first plane such that a first threaded bore defined in said base member has a longitudinal axis extending perpendicular to said first plane;

wherein said first member is a screw member having a diameter D and having a distal end with an annular edge corresponding to said predetermined portion of said first member;

threadedly engaging said screw member in said first threaded bore;

wherein the step of translating said first member includes rotating the screw member in said first bore until the annular edge of said distal end of the screw member contacts said second plane;

wherein said second member is an annular collar member having an outer diameter D' and an annular outer wall corresponding to said predetermined portion of said second member;

threadedly engaging said screw member in said collar member; and wherein the step of translating said second member includes rotating the collar member about said screw member until the annular outer wall contacts said second plane;

wherein said predetermined spacing is equal to one-half the difference between D' and D.

11. Apparatus for measuring an acute dihedral angle formed between first and second planes intersecting at a line, said apparatus comprising:

a base member adapted to be placed in a deployed position on said first plane;

an elongated member having proximal and distal ends;

means for mutually engaging said base member and said elongated member with said distal end extending generally toward said second plane to permit longitudinal movement of said elongated member relative to said base member in a direction perpendicular to said first plane when said base member is in said deployed position, said elongated member having a first contact edge disposed proximate the distal end for contacting said second plane upon sufficient longitudinal extension of said elongated member relative to said base member, said first contact edge moving with said elongated member along a first predetermined axis extending perpendicular to said first plane;

a further member having a remote end;

means for mounting said further member, with said remote end facing generally toward said second plane, to permit longitudinal movement of said further member relative to said base member in a direction perpendicular to said first plane when said base member is in said deployed position, said further member having a second contact edge disposed proximate said remote end for contacting said second plane upon sufficient longitudinal translation of said further member relative to said base member, said second contact edge moving with said further member along a second predetermined axis spaced from and extending parallel to said first predetermined axis;

wherein said first and second predetermined axes define a plane which is perpendicular to the line of intersection of said first and second planes; and wherein, when said first and second contact edges are in contact with said second plane, said dihedral angle is defined as the angle having a tangent equal to $(y' - y)$ divided by the distance between said first and second predetermined axes, where $y'$ is the spacing of said first contact edge from said first plane along said first predetermined axis, and $y$ is the distance of said second contact edge from said first plane along said second predetermined axis.

* * * * *